UNITED STATES PATENT OFFICE.

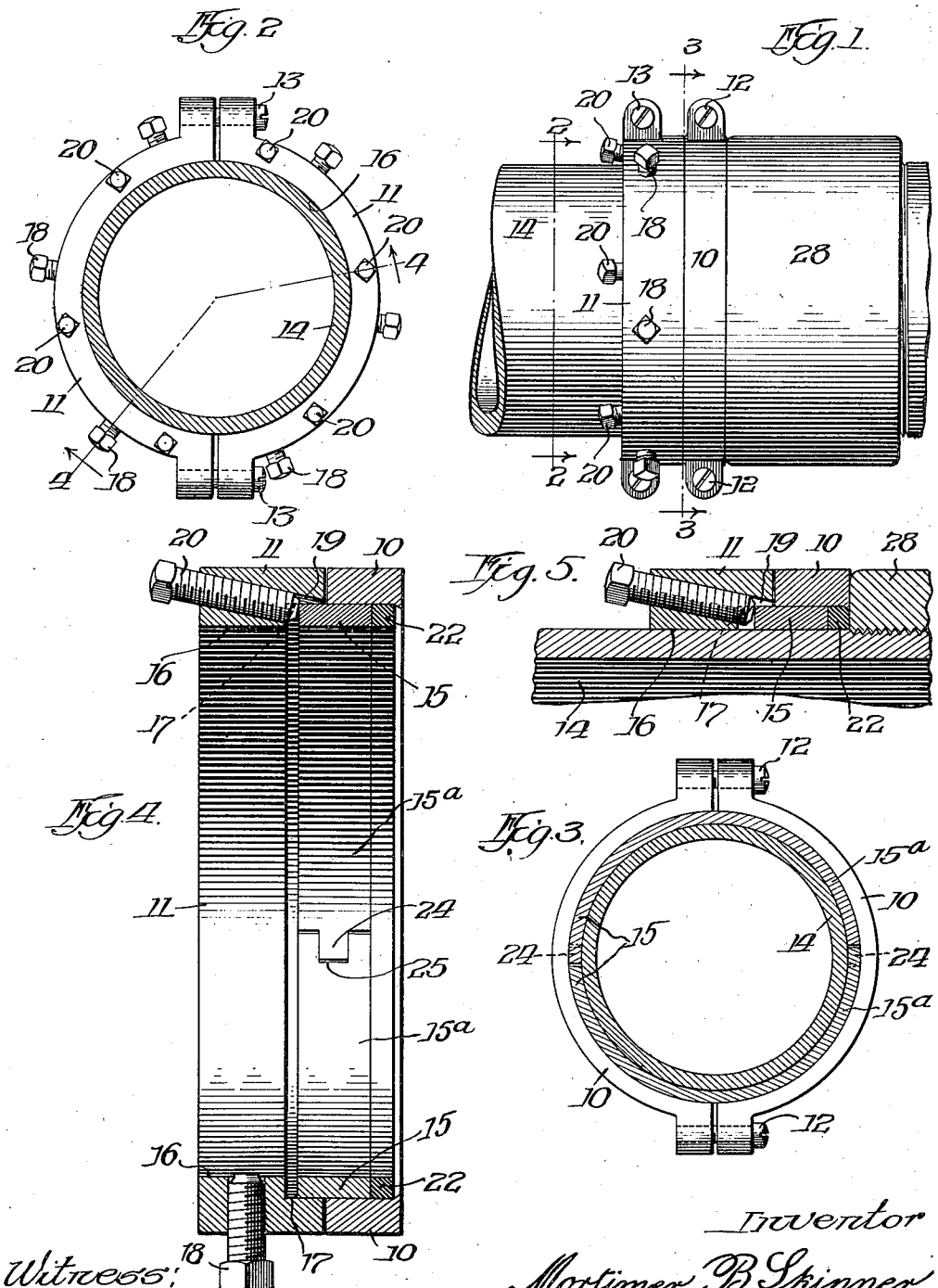

MORTIMER B. SKINNER, OF WILMETTE, ILLINOIS.

PIPE-JOINT-PACKING DEVICE.

1,242,380.   Specification of Letters Patent.   Patented Oct. 9, 1917.

Application filed May 28, 1917. Serial No. 171,359.

*To all whom it may concern:*

Be it known that I, MORTIMER B. SKINNER, a citizen of the United States, and a resident of Wilmette, in the county of Cook and State of Illinois, have invented certain new and useful Improvements in Pipe-Joint-Packing Devices, of which the following is a specification.

The present improvements relate to devices for packing the joints of pipes. Their principal objects are to provide simple, effective and readily operable means for stopping leakage at pipe connections, and to do so more advantageously in various respects than is possible according to hitherto suggested forms. More specific objects and advantages will appear hereinafter.

These improvements inhere in a new combination, arrangement, and construction of parts providing new and improved results, and do not include the broad principle of operation involved in the illustrated device, as witness U. S. Letters Patent No. 624,193 of May 2, 1899 to Dietrich, No. 688,683 of December 10, 1901 to Phillips, No. 706,780 of August 12, 1902 to Reed, and No. 908,335 of December 29, 1908 to Schmidt.

In the accompanying drawings, which form a part of this specification, Figure 1 is a side view of pipe fragments united by a coupling with the present improvements in operative position thereon;

Fig. 2 is a vertical, transverse section as on the line 2—2 of Fig. 1;

Fig. 3 is a similar section as on the line 3—3 of Fig. 1;

Fig. 4 is an enlarged sectional view as on the broken line 4—4 of Fig. 2, the sectional views respectively being in the directions of the arrows; and Fig. 5 is a fragmentary view of the upper portion of Fig. 4 as applied to the pipe parts of Fig. 1 and showing an advanced position of the compression ring and packing beyond that of Fig. 4.

The confining ring 10 and the clamping or anchoring ring 11 have their two semi-circular sections respectively held together by bolts or screws 12 and 13 passing through suitable lugs. The confining ring 10 is sufficiently larger in diameter than the pipe 14 to accommodate the sectional compression ring 15 movably between the pipe and the ring 10. The clamping ring 11 has an inside diameter at 16 substantially that of the outside diameter of the pipe 14, but at the inner annular surface 17 of the ring 11 the diameter is substantially that of the inside diameter of the ring 10 whereby the compression ring 15 is accommodated and housed in what is substantially a recess between the pipe 14 and the combined rings 10 and 11. The ring 11 has a plurality of substantially radial binding screws 18 whereby this ring may be held rigidly upon the pipe 14. The ring 11 has also a plurality of compression screws 20 so directed as to engage an edge portion of the compression or follower ring 15, the screws being preferably slightly inclined toward the axis of the device and of the pipe 14 whereby a wrench may more easily be applied to the heads of the screws. Where the screws enter the recess principally defined by the annular surface 17 the recess is enlarged as at 19 to provide clearance for the screws. Packing material 22 in ring form, and suitably of rubber compound, is normally in advance of the compression ring 15 and is also surrounded closely by the ring 10.

The compression ring or follower 15 is preferably made of two similar half rings 15ᵃ—15ᵃ. A projecting tongue 24 and a corresponding recess 25 on opposite ends of each half ring 15ᵃ (preferably having edge walls substantially parallel with the edges of the ring 10) provide an interlocking of these two half rings whereby pressure upon one thereof in the vicinity of one of the two joints will be transmitted to the other thereof, the packing thus being substantially uniformly compressed, there being at the same time sufficient flexibility of the joints to prevent a straining or breakage of parts or a canting of the ring 15 when the screws 20 are unevenly advanced. The provision of means for avoiding such injurious consequences is important since devices of this kind are frequently applied by workmen unskilled in making mechanical adjustments with the accuracy ofttimes heretofore required.

The principal desiderata in a device of this character are strength, compactness of form, simplicity and fewness of parts, simplicity of application, and effectiveness in operation, even by unskilled hands. As is well understood, such devices are designed for application to leaky joints, as between the coupling 28 and the pipe 14, or wherever a pipe is screwed into a fitting or connection having an abutting face substantially on a plane at right angles with the direction of the pipe. The provision of the confining ring 10 and the clamping ring 11 substantially locked together by the ring 15 enables the operator, regardless of his skill in mechanics, to affix the device in operative position whereby the anchoring ring 11 must necessarily be in its true relation to the joint to be sealed and to the confining ring 10, and whereby the follower or compression ring 15 is in proper relation to the rest of the parts. Thus, after the several parts have been assembled somewhat loosely upon the pipe a short distance from the place where the leakage occurs the operator can move the device bodily against the connection part, as 28, and, while holding the parts thus in their true and exact operative relation to each other, and with the rings 10 and 11 face to face, the several binding screws 18 can be tightened upon the pipe and thus the anchoring ring 11 is secured in the exact position required. When it is desired to examine the packing material 22, to add thereto or to make substitutions of new material, the confining ring 10 may be readily removed for such purpose, the repairs or alterations may thereupon be readily made, and the ring 10 replaced, all without changing the relative position of the anchoring ring 11, and without again bringing into the operation the question of the proper relationship of the several parts to provide their desired free, easy and effective operation.

The provision of a follower or compression ring, as 15, within the body of the two rings 10 and 11 also makes for notable compactness of the device in the direction of the length of the pipe, a feature quite important in many situations. At the same time there is thus provided a unitary structure of substantially circular form adapted to lie substantially close to the pipe and having but few radially outstanding parts, namely, the screws 18 and the lugs containing the screws 12 and 13.

A notable feature also is in the fact that the present form of device is equally advantageous in all sizes for which there may be demand.

The rings 10, 11 and 15 are ordinarily made of metal castings, the bolts or screws being of bronze, iron or steel, the manufacture being according to methods well understood in the mechanic arts.

I claim:

In a device of the character described, the combination of a sectional anchoring ring and a sectional confining ring closely adjacent to each other and adapted coaxially to surround a pipe, a sectional compression ring closely surrounded coaxially by said other two rings and housed thereby, said other two rings jointly providing an annular recess in which said compression ring substantially fits and may move in the direction of the axis of the rings, packing material in ring form adjacent to the compression ring and surrounded by the confining ring at the end thereof normally adjacent to the joint to be sealed, means for holding said anchoring ring rigidly upon a pipe, and means for forcing said compression ring in the direction of said packing material whereby the packing material is forced against the joint to be sealed when the device is normally in use.

MORTIMER B. SKINNER.